(12) United States Patent
Greenfield

(10) Patent No.: US 6,748,528 B1
(45) Date of Patent: Jun. 8, 2004

(54) METHODS, SYSTEMS, AND COMPUTER PROGRAM PRODUCTS FOR ESTABLISHING SECURED SSL COMMUNICATION SESSIONS

(75) Inventor: Jonathan Scott Greenfield, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,540

(22) Filed: Aug. 30, 1999

(51) Int. Cl.[7] .............................. H04L 9/00; H04L 9/32
(52) U.S. Cl. ...................... 713/151; 713/155; 713/156; 713/168
(58) Field of Search ................................ 713/151, 168, 713/155–156

(56) References Cited

U.S. PATENT DOCUMENTS 5,657,390 A     8/1997  Elgamal et al. ............... 380/49
6,367,009 B1 *  4/2002  Davis et al. .................. 713/166

* cited by examiner

Primary Examiner—Gilberto Barron
Assistant Examiner—G. Gurshman
(74) Attorney, Agent, or Firm—Jerry W. Herndon; Myers, Bigel, Sibley and Sajovec, P.A.

(57) ABSTRACT

Methods, systems and computer program products are provided which allow "bootstrapping" of credentials by a client application using the well known certificate authority SSL capabilities of another installed application, such as a browser. A first secured session is established between the client and a server which has a certificate including a digital signature from a well known certificate authority. For example, a hypertext transport protocol over SSL (HTTPS) session may be established to the server by a browser such as Netscape™ or Internet Explorer™. An additional public key, or public key ring is then downloaded from the server to the client which may be subsequently used by the client to establish SSL sessions with servers that do not have a certificate from a well known certificate authority.

38 Claims, 4 Drawing Sheets

METHODS, SYSTEMS, AND COMPUTER PROGRAM PRODUCTS FOR ESTABLISHING SECURED SSL COMMUNICATION SESSIONS

FIELD OF THE INVENTION

The present invention relates to secured communications and more particularly to secured communications based on the Secure Socket Layer (SSL) protocol.

BACKGROUND OF THE INVENTION

In communications between a client and a server, it is often beneficial to provide increased security. One mechanism for providing increased security is through the use of the Secure Socket Layer (SSL) protocol which uses a hybrid public-key system in which public-key cryptography is used to allow a client and a server to securely agree on a secret session key.

FIG. 1 illustrates a conventional SSL connection between a client 10 and a server 12. As seen in FIG. 1, the client 10 communicates directly with the server 12 utilizing the SSL connection 16.

The SSL protocol may provide privacy and integrity between two communicating applications. The SSL protocol typically utilizes two layers, the lowest layer of which is the SSL Record Protocol, which is layered on top of a communications protocol such as TCP/IP. The SSL Record Protocol encapsulates higher level protocols such as the SSL Handshake Protocol. The SSL Handshake Protocol allows the server and client to authenticate each other and to establish an encryption method and keys. The SSL protocol is further described in U.S. Pat. No. 5,657,390 entitled "Secure Socket Layer Application Program Apparatus and Method" which is incorporated herein by reference as if set forth in its entirety.

One advantage of SSL is that it is application protocol independent. A higher level protocol can layer on top of the SSL Protocol transparently. Thus, the SSL protocol provides connection security where encryption is used after an initial handshake to define a secret key for use during a session and where the communication partner's identity can be authenticated using, for example, a well known public certificate issuing authority. Examples of such well known certificate authorities include RSA Data Security, Inc, Verisign™ and EquiFax™.

Authentication is important in establishing the secure connection as it provides a basis for the client to trust that the server (typically identified by its Universal Resource Locator (URL)) is the entity associated with the server public key provided to the client and used to establish the secret session key. As noted above, this authentication may be provided through the use of certificates obtained by the server from one of the well known certificate authorities. The certificate (such as a X.509 certificate) typically includes an identification of the server (such as its hostname), the server's public key, and a digital signature which is provided by the well known certificate authority and which is used by a client receiving the certificate to authenticate the identity of the server before initiating a secured session. In particular, the application on the client initiating the secured communication session, such as a browser, is typically installed with a public key ring including public keys for various of the well known certificate authorities which allow the client to verify server certificates issued by these certificate authorities.

One problem with SSL implementations based on certificates from well known certificate authorities is the cost and administrative burdens associated with obtaining a certificate from one of the well known certificate authorities. This can be particularly problematic for corporate or other networks having a plurality of servers and which may add additional server stations over time as each server typically requires its own certificate before it will be "trusted" by clients.

One option is to rely on a self-signed certificate or a certificate signed by a local certificate authority. However, this typically requires either that a local private key be deployed to all client machines securely (such as through an out of band process) or that the keys be insecurely downloaded during the negotiations establishing an SSL session, thereby potentially reducing the security of the session.

An additional problem with SSL implementations using browsers is that the browser typically does not make its public key ring available to other applications on the client. In addition, browsers typically only support Hypertext Transport Protocol (HTTP) communications. Accordingly, it is often difficult to provide a public key ring to other applications which may desire the use of SSL secured communications which are not based on HTTP.

One solution to the problem of SSL support for non-HTTP sessions is provided by the Host on Demand™ product from International Business Machines Corporation through the SSLight™ java toolkit. In this application, a public key may be provided for use by an application being downloaded to the client from a Host on Demand server. The public key or key ring may be included in a class file which is included with the application when it is downloaded. Accordingly, if the browser interface between the client and the host on demand server is set up as a secured connection, such as a HTTP over SSL (HTTPS) connection, the public key in the class file may be securely transferred. However, a problem with this approach is that the entire application transfer must occur on a secured connection, thereby creating an unneccesary performance disadvantage as there may be no need to secure the remainder of the transfer.

In light of the above discussion, a need exists for improvements in the authentication process for servers under the SSL protocol to address the limitations associated with the use of well known certificate authorities and self-signed certificates.

SUMMARY OF THE INVENTION

In view of the above discussion, it is an object of the present invention to provide systems and methods which can allow secure authentication in SSL systems with reduced reliance on well known certificate authorities.

A further object of the present invention is to provide such systems and methods which can support network environments with a plurality of clients and servers which are controlled by a common organization, such as a corporation.

These and other objects of the present invention may be provided by methods, systems and computer program products which allow "bootstrapping" of credentials by a client application using the well known certificate authority SSL capabilities of another installed application, such as a browser. A first secured session is established between the client and a server which has a certificate including a digital signature from a well known certificate authority. For example, a HTTPS session may be established to the server by a browser such as Netscape™ or Internet Explorer™. An additional public key, or public key ring is then downloaded from the server to the client which may be subsequently used by the client to establish SSL sessions with servers that do not have a certificate from a well known certificate authority.

By using bootstrapping on the secured session to download additional public keys, the present invention allows SSL sessions to be subsequently setup by an application with servers that do not have certificates from a well known certificate authority, thereby possibly avoiding financial and administrative expenses. As an additional advantage, a public key can be downloaded from a server, which may have a certificate from a well known certificate authority, which public key can be provided by the browser to a separate application which supports a variety of communication protocols. This may be advantageous as a browser typically only supports HTTP and typically does not make its public key ring available to other applications residing on the client.

In an embodiment of the present invention, a method is provided for establishing secured communication sessions between a client and a server. A first secured communication session, which is preferably a secured SSL communication session, is established between the client and a first server based on a certificate transmitted from the first server to the client, the first server certificate being supported by a public key ring of the client. Subsequently, at least one public key associated with a second server is transmitted to the client over the first secured SSL communication session wherein the at least one public key is provided separate from any associated application code class files.

In one embodiment of the present invention, the second server is the first server. Furthermore, a HTTPS communication session is established over which the at least one public key is transmitted to the client. Subsequently, a second secured SSL communication session is established between the client and the first server utilizing a communications protocol other than HTTP.

In a further embodiment, the second server is different from the first server. A second secured SSL communication session between the client and the second server is established based on the at least one public key after it is received by the client. In one embodiment, the first secured SSL communication session is an HTTPS session. In a further aspect, a public key ring including the at least one public key associated with the second server and at least one additional public key associated with a third server different from the first server and the second server is transmitted to the client for use in establishing subsequent SSL communication sessions. Different ones of the public keys from the public key ring may be used by the client for SSL communication sessions with respective ones of the servers.

In a further embodiment of the present invention, a method is provided for establishing secured communication sessions including establishing a first secured communication session, which is preferably a secured SSL communication session, between a client and a first server based on a certificate transmitted from the first server to the client, the first server certificate being supported by a public key ring of the client. Subsequently, at least one public key associated with a second server different from the first server is received from the first server over the first secured SSL communication session and a second secured SSL communication session is established between the client and the second server based on the at least one public key. In one embodiment, the at least one public key is not included in the public key ring of the client and the at least one public key is provided separate from any associated application code class files.

As will further be appreciated by those of skill in the art, while described above with reference to method aspects, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or a computer program products for establishing secured SSL communication sessions using bootstrapping. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
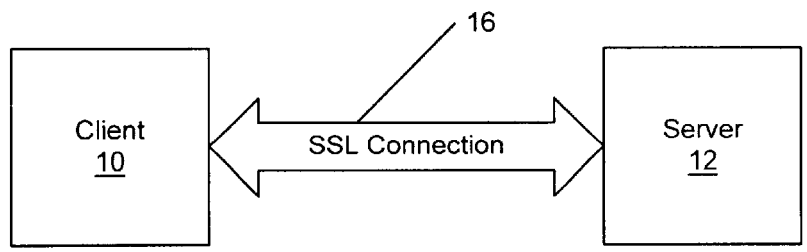
FIG. 1 is block diagram illustrating conventional SSL communications between a client and a server.
Figure 2:
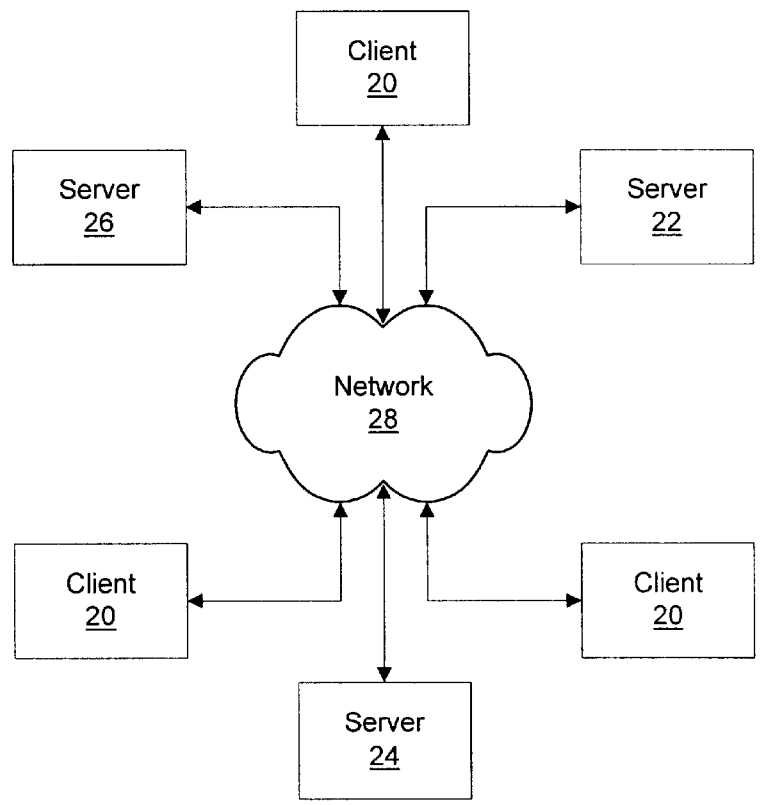
FIG. 2 is a block diagram illustrating a network including clients and servers including bootstrapped SSL communications according to an embodiment of the present invention.

Referring now to FIG. 2, a network including clients and servers supporting boot strapped SSL communications according to an embodiment of the present invention is illustrated. As shown in FIG. 2, one or more clients 20 interact and communicate with server 22, server 24 and server 26 over a network 28. A client 20 includes an application, such as a browser, which is provided to the client 20 along with a public key ring for use in authenticating certificates from well known certificate authorities for setting up SSL communication sessions through techniques known to those of skill in the art or other forms of secured communications based on public key systems. While not shown in FIG. 2, the client 20 may also include the ability to establish a secured connection with the server 22, 24, 26 without the use of a public key based protocol, such as the use of a private out of band communication link.

At least one of the servers 22, 24, 26 includes a server application along with an associated certificate obtained by the server 22, 24, 26 from a well known certificate authority for use in establishing a secured connection with a client 20. For purposes of the discussion herein, it is to be understood that the server 22 is such a server which has an associated public key authenticated by an authentication authority such as a well known certificate authority. The certificate authority's public key is further included in the public key ring of the clients 20 such as in a browser.

In the embodiment illustrated in FIG. 2, servers 24 and server 26 each have an associated public key which is not supported by a certificate providing authentication supported by the public key ring of the client 20.

The network 28 typically will include at least a portion of the network which is part of the Internet environment of the World Wide Web wherein there is a need for secured communications as non-authorized users could otherwise obtain access to confidential information and misappropriate this information. For example, such a non-authorized user could connect to network 28 and attempt to impersonate the server 24 or the server 26 so as to induce one of the clients 20 to provide confidential information.

Figure 3:
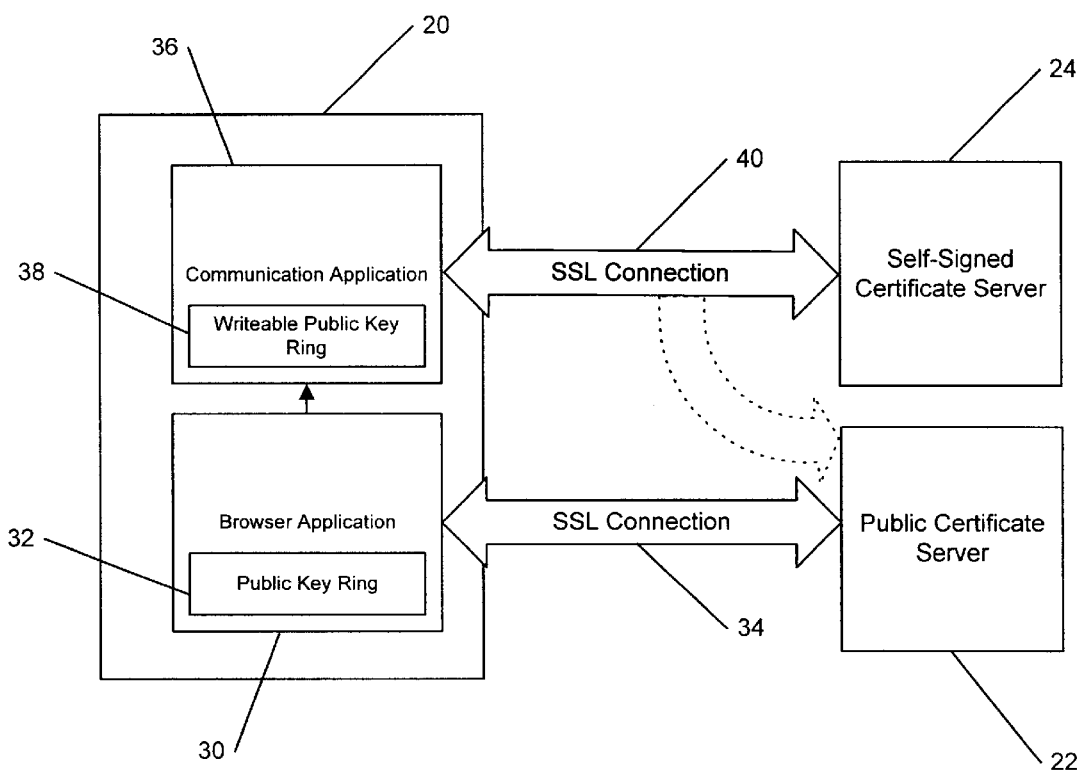
FIG. 3 is a block diagram illustrating an embodiment of a client according to the present invention supporting SSL communications with a plurality of servers.

An embodiment of a client 20 according to the present invention supporting SSL communication sessions with a plurality of servers 22, 24, 26 will now be described with reference to the block diagram of FIG. 3. As shown in the embodiment of FIG. 3, the client 20 includes a browser application 30 executing on the client 20. The browser application 30, as known to those of skill in the art, supports HTTP communications and further supports HTTPS secured communications. The connection is typically supported using the Internet protocol over network 28. As known to those of skill in the art, commercially available browser applications 30 typically include a public key ring 32 which is provided with the browser application 30. The public key ring 32 includes the associated public keys for various well known certificate authorities such as RSA™ and Veriserv™. The browser application 30 and public certificate authorized server 22 support establishment of a secured SSL communication session 34 between the client 20 and the server 22. This SSL connection 34 is negotiated based on a certificate transmitted from the server 22 to the client 20. It is to be understood that, while the invention is described herein with reference to preferred embodiments in which the first connection 34 is an SSL connection, the present invention also encompasses embodiments in which another type of secured connection known to those of skill in the art is used for the first connection 34.

In the illustrated embodiment of FIG. 3, the server 22 further includes optional means for determining if the client 20 establishing the connection 34 is an authorized recipient of boot strapping information for use according to the present invention. The server 22 further includes means for transmitting over the connection 34 at least one public key associated with a second server 24 over the connection 34 to the client 20. As will be described further later herein with reference to the flow chart illustrations of operations according to the present invention, the public key transferred over the SSL connection 34 may, in some embodiments, be the public key of the server 22 rather than a separate server 24.

A client 20 further includes a communication application 36 executing on the client 20 which supports various functions including communication functions which are related to the boot strapping benefits of the present invention and will be described further herein. However, it is to be understood that the communication application 36 may also support various other functional aspects for user operations through the client 20 which will not be described herein as they do not relate to the present invention.

As shown in FIG. 3, the communication application 36 includes a writeable public key ring 38. The writeable public key ring 38 is configured to receive one or more public keys associated with servers 22, 24, 26 which are provided to the communication application 36 by the browser application 30. More particularly, in one embodiment of the present invention, the communication application 36 initiates execution of an instance of the browser application 30 for the express purpose of establishing a secure connection 34 with server 22 so as receive at least one public key from server 22 over a secure connection 34. Alternatively, the communication application 36 may be implemented to execute inside an instance of the browser application 30 in which case it initiates a new connection within the already initiated browser instance. In these embodiments, the actual transmitted public key is then provided by the browser application 30 to the communication application 36 without any requirement for the browser application 30 to recognize the content of data received from the server 22 over the connection 34. The communication application 36 then updates or, alternatively, overwrites its writeable public key ring information 38 with the newly obtained information provided by the browser application 30. Once the public key information is received by the client 20, the SSL connection 34 may be terminated. As shown in FIG. 3, the communication application 36 is configured to use the public key information from its associated writeable public key ring 38 to establish additional secured connections 40 independent of the browser application 30. The SSL protocol based secured connection 40 may be an HTTPS type connection but may also be other known types of connections such as Lightweight Directory Access Protocol (LDAP) over SSL, Java Remote Method Protocol (JRMP) over SSL or Internet Inter-ORB protocol (IIOP) over SSL. Furthermore, as illustrated by the dotted line portion of the arrow representing the connection 40, the connection 40 established by the communication application 36 using its writeable public key ring 38 may be a connection to the server 22 which provided the key ring information or be a connection to a different server 24.

Embodiments where the communication connection 40 initiated by the communication application 36 is back to the server 22 are advantageous to provide communication protocol support with SSL type security using a variety of communication protocols other than HTTP where the browser application 30 is only able to support HTTP communications. In embodiments where the communication application 36 establishes a connection 40 with a self-signed certificate server 24, the present invention's use of boot strapping advantageously obviates the need to obtain certificates from a well known public certificate authority by enabling the use of secured communications using self-signed certificates. Unlike conventional self-signed certificates, where there is typically an unsecured initial communication of a public key from server 24 to the client 20 which creates a risk of corruption the information in writeable public key ring 38, the present invention provides for a secure delivery of the public key used to validate the public key certificate for the server 24 to the client 20 without reliance on unsecured or out of band (non-public network) communications. In other words, the authentication trust which resides in the public certificate based server 22 is boot strapped to create a corresponding trust in the self-signed certificate server 24 by the fact that the public key information for the self-signed certificate server 24 was initially provided to the communication application 36 by the trusted public certificate server 22 over a secure connection 34. Accordingly, the present invention allows a communication application 36 to boot strap credentials from the browser application 30 in order to securely deploy public keys for other servers 24 to the client 20 without requiring an out of band deployment of keys to the clients 20 and without forcing the application 36 to require certificates signed by well known certificate authorities from all servers including server 24 and server 26.

Using this boot strap type distribution of public keys, the operator of the public certificate server 22 can periodically update the information contained in the writeable key ring 38 to reflect additions or deletions of servers 24, 26 without any notification to a well known certificate authority. Furthermore, a plurality of servers supporting secured communications with the clients 20 may be implemented while only obtaining a single certificate from a well known certificate authority.

In a further aspect of the present invention, the operator of the servers 22, 24, 26 may choose to distribute a single public/private key pair to each of the servers 24, 26 in the system in which case only a single public key needs to be downloaded via the boot strap connection 34. Subsequently, the clients 20 may establish an SSL connection 40 with any of the servers 24, 26 in the application environment and securely verify that the access server 24, 26 is a bona fide part of the system by verifying that the server public key downloaded over the secured connection 34 and placed in public key ring 38 matches the server public key provided by the server 24, 26 during negotiation setting up the secured connection 40.

Figure 4:
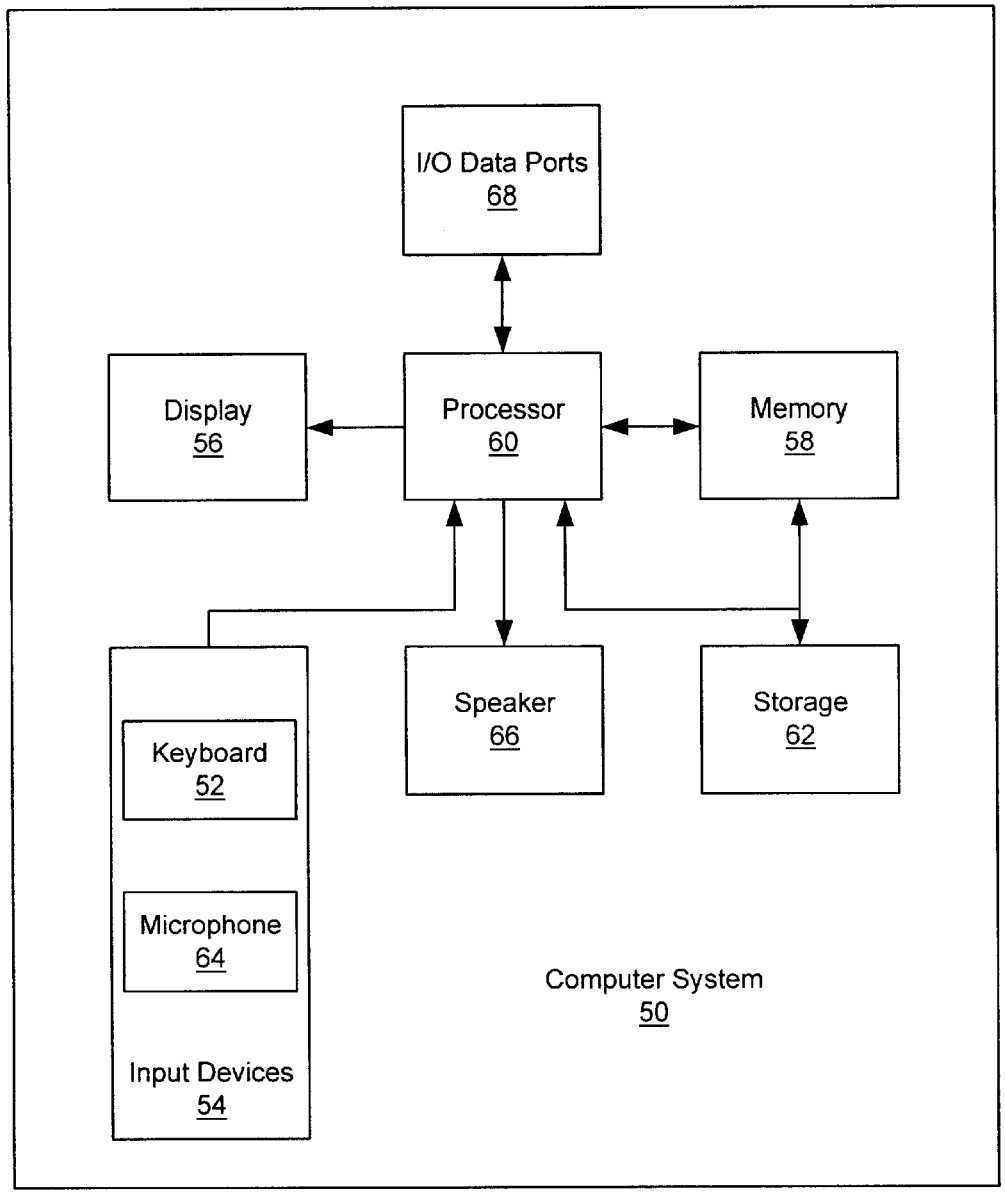
FIG. 4 is a block diagram of a computer system for providing a client or a server according to one embodiment of the present invention.

Referring now to FIG. 4, an exemplary embodiment of a computer system 50 suitable for use as a client 20 or a server 22, 24, 26 in accordance with the present invention is illustrated. The computer system 50 may include input devices 54, such as a keyboard or keypad 52 and/or a microphone 64. The computer system 50 also preferably includes a display 56 and a memory 58 that communicate with a processor 60. The computer system 30 may further include a speaker 66 and an I/O data port(s) 68 that also communicate with the processor 60. The I/O data ports 46 provide the physical layer support for secured communications sessions 34, 40 as described previously.

FIG. 4 also illustrates that computer system 50 may include a storage device 62 which communicates with the memory 58 and the processor 60. Such a storage device may be any type of data storage device as described above. These components are included in many conventional computer systems (e.g., desktop, laptop, or handheld computers) suitable for operating as a client 20 or a server 22, 24, 26 and their functionality is generally known to those skilled in the art.

The processor 60 executes the browser application 30 and the communication application 36 functions for a client 20 or the corresponding operations for a server 22, 24, 26 as described above with reference to FIG. 2 and FIG. 3. The public key ring 32 and the writeable public key ring 38 may be stored in the memory 58 and/or the storage device 62. Furthermore, a single computer system 50 may operate as both a client 20 and a server 22, 24, 26 for different communication sessions.

Furthermore, while the present invention is described with respect to the computer system 50, as will be appreciated by those of skill in the art, the present invention may be incorporated into many other devices where SSL communication sessions are desired and, thus, may comprise an embedded function in many other devices. Thus, the present invention should not be construed as limited to use in computer systems such as illustrated in FIG. 4 but may be incorporated in any device having sufficient processing capabilities to carry out the operations described below.

Figure 5:
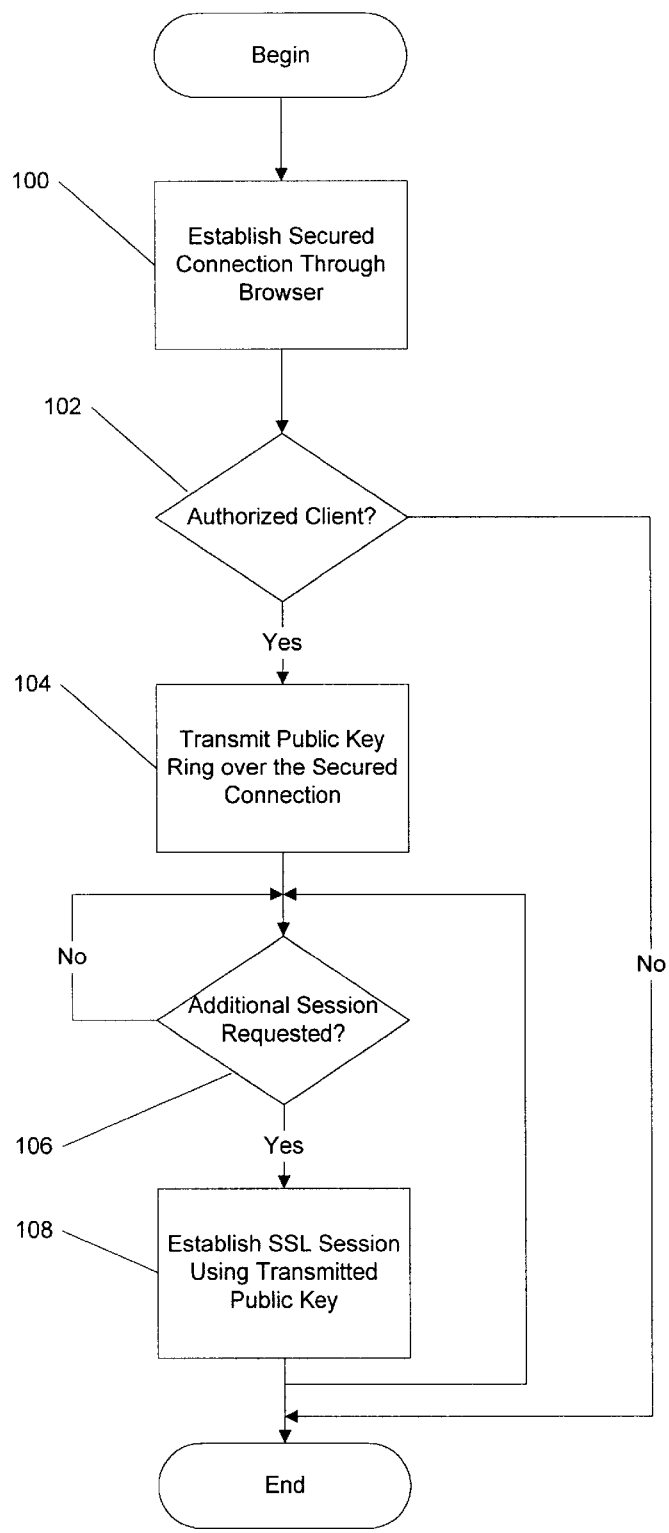
FIG. 5 is a flowchart illustrating operations according to one embodiment of the present invention for establishing a bootstrapped SSL communication session.

The present invention will now be described with respect to the flowchart illustration of FIG. 5. FIG. 5 illustrates an embodiment of operations according to the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

FIG. 5 illustrates an embodiment of the present invention which provides for the use of boot strapping in establishing secured SSL communication sessions between a client 20 and a server 22, 24, 26. Operations begin at block 100 with the establishment of a first secured SSL communication session 34 between the client 20 and the first server 22 based on a certificate transmitted from the first server 22 to the client 20. As described previously, the certificate transmitted by first server 22 is supported by public key ring 32 of the client 20. Preferably, the certificate transmitted by the first server 22 is provided by one of a number of well known certificate authorities. In this case, commercially available browser applications typically come installed on computer systems 50 allowing implementation of a client 20 using the already installed browser application 30 which generally is provided with a public key ring 32 including the necessary keys to recognize and authenticate certificates from any of the well known certificate authorities. In this embodiment, the first secured connection 34 is preferably an HTTPS communication session.

Once the first secured connection 34 is established, the server 22 determines if the client 20 establishing the connection 34 is an authorized client, i.e., a client 20 entitled to receive a download of a public key ring over the connection 34, and whether the connection 34 has been established with the intent of obtaining a download of a public key ring from the server 22 (block 102). If the client 20 establishing the connection 34 is not an authorized client, boot strapping operations according to the present invention are not implemented. However, if the client 20 establishing the connection 34 is an authorized client, the public certificate server 22 transmits at least one public key associated with a server 22, 24, 26 to the client 20 over the first secured SSL communication session 34 (block 104). Preferably, a public key ring including the at least one public key associated with a server 22, 24, 26 and at least one additional public key associated with another server 22, 24, 26 is downloaded at block 104. In one embodiment of the present invention, the at least one public key downloaded over the connection 34 is provided to the client 20 separate from any associated application code class files. In other words, the secure connection 34 may be used solely for secure downloading of the public key ring without introducing the added burden of a secured connection for other application exchange operations such as might be encountered in an on-demand server architecture.

Following receipt of the public key ring over the SSL connection 34, when an additional session is requested by a user (block 106), the communication application 36 of the client 20 establishes a second secured SSL communication session 40 between the client 20 and a server 22, 24, 26 (block 108). In one embodiment of the present invention, the first connection 34 and the second connection 40 are both between the client 20 and the public certificate server 22. In this embodiment, the second connection 40 is not an HTTP based communication session thereby providing additional SSL communication support through the communication application 36 which is not typically supported by installed browser applications 30. In a further embodiment of the present invention, the second connection 40 is between the client 20 and a different self-signed certificate server 24 as illustrated, for example, in FIG. 3.

As is further illustrated in the flow chart of FIG. 5, after the second SSL communication session 40 is established, operations return to block 106 to determine if additional sessions have been requested. Accordingly, once a public key ring has been downloaded over the SSL connection 34, a plurality of additional SSL connections 40 may be established between the client 20 and one or more servers 22, 24, 26. Furthermore, as noted above, each of the servers 22, 24, 26 may be provided with a common public key thereby allowing a plurality of severs 22, 24, 26 to be supported by communication application 36 with only a single public key transferred over the SSL connection 34 and placed in the writeable public key ring memory 38. Alternatively, each of the servers 22, 24, 26 may have a unique public key and the respective public keys may all be included in a suitable public key ring for downloading over the SSL connection 34.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for establishing secured communication session between a client and a server, the method comprising the steps of:

establishing a first secured communication session between the client and a first server based on a certificate transmitted from the first server to the client, the first server certificate being supported by a public key ring of the client; and then transmitting at least one public key associated with a second server to the client over the first secured communication session wherein the at least one public key is provided separate from any associated application code class files.

2. A method according to claim 1 wherein the first secured communication session is a secured Secure Socket Layer (SSL) communication session.

3. A method according to claim 2 wherein the second server is the first server and wherein the establishing step comprises the step of establishing a HTTPS communication session and wherein the step of transmitting is followed by the step of establishing a second secured SSL communication session between the client and the first server utilizing a communications protocol other than HTTP.

4. A method according to claim 2 wherein the second server is different from the first server.

5. A method according to claim 4 wherein the transmitting step is followed by the step of establishing a second secured SSL communication session between the client and the second server based on the at least one public key.

6. A method according to claim 4 wherein the first secured SSL communication session is an HTTPS session.

7. A method according to claim 4 wherein the transmitting step further comprises the step of transmitting a public key ring including the at least one public key associated with the second server and at least one additional public key associated with a third server different from the first server and the second server.

8. A method according to claim 4 wherein the transmitting step further comprises the step of transmitting at least one public key associated with the second server and with a third server and wherein the transmitting step is followed by the steps of:

establishing a second secured SSL communication session between the client and the second server based on the at least one public key; and establishing a third secured SSL communication session between the client and the third server based on the at least one public key.

9. A method for establishing secured communication sessions comprising the steps of:

establishing a first secured communication session between a client and a first server based on a certificate transmitted from the first server to the client, the first server certificate being supported by a public key ring of the client; and then receiving at least one public key associated with a second server different from the first server from the first server over the first secured communication session; and establishing a second secured SSL communication session between the client and the second server based on the at least one public key.

10. A method according to claim 9 wherein the first secured communication session is a secured SSL communication session.

11. A method according to claim 10 wherein the at least one public key is not included in the public key ring of the client.

12. A method according to claim 11 wherein the at least one public key is provided separate from any associated application code class files.

13. A method according to claim 11 wherein the step of establishing a first secured SSL communication session comprises the step of establishing a HTTPS communication session and wherein the step of establishing a second secured SSL communication session comprises the step of establishing a second secured SSL communication session utilizing a communications protocol other than HTTP.

14. A method according to claim 11 wherein the transmitting step further comprises the step of transmitting a public key ring including the at least one public key associated with the second server and at least one additional public key associated with a third server different from the first server and the second server.

15. A server supporting secured communication sessions with a client, the server comprising:
    means for establishing a first secured communication session between the client and the server based on a certificate transmitted from the server to the client, the server certificate being supported by a public key ring of the client; and
    means for transmitting at least one public key associated with a second server to the client over the first secured communication session wherein the at least one public key is provided separate from any associated application code class files.

16. A server according to claim 15 wherein the means for establishing a first secured communication session comprises means for establishing a first secured SSL communication session.

17. A server according to claim 16 wherein the second server is the server and wherein the means for establishing comprises means for establishing a HTTPS communication session and wherein the means for establishing further comprises means for establishing a second secured SSL communication session between the client and the server using the at least one public key, which second secured SSL communication session utilizes a communications protocol other than HTTP.

18. A server according to claim 16 wherein the second server is different from the first server.

19. A server according to claim 18 wherein the first secured SSL communication session is an HTTPS session.

20. A server according to claim 18 wherein the means for transmitting further comprises means for transmitting a public key ring including the at least one public key associated with the second server and at least one additional public key associated with a third server different from the first server and the second server.

21. A client supporting secured communication sessions, the client comprising:
    means for establishing a first secured communication session between the client and a first server based on a certificate transmitted from the first server to the client, the first server certificate being supported by a public key ring of the client; and
    means for receiving at least one public key associated with a second server different from the first server from the first server over the first secured communication session; and
    means for establishing a second secured SSL communication session between the client and the second server based on the at least one public key.

22. A client according to claim 21 wherein the means for establishing a first secured communication session comprises means for establishing a first secured SSL communication session.

23. A client according to claim 22 wherein the at least one public key is not included in the public key ring of the client.

24. A client according to claim 23 wherein the at least one public key is provided separate from any associated application code class files.

25. A client according to claim 23 wherein the means for establishing a first secured communication session comprises means for establishing a HTTPS communication session and wherein the means for establishing a second secured SSL communication session comprises means for establishing a second secured SSL communication session utilizes a communications protocol other than HTTP.

26. A client according to claim 23 wherein the means for transmitting further comprises means for transmitting a public key ring including the at least one public key associated with the second server and at least one additional public key associated with a third server different from the first server and the second server.

27. A computer program product for establishing secured communication sessions between a client and a server, comprising:
    a computer readable storage medium having computer readable program code embodied in said medium, said computer readable program code comprising:
        computer readable code which establishes a first secured communication session between the client and the server based on a certificate transmitted from the server to the client, the server certificate being supported by a public key which is included in a public key ring of the client; and
        computer readable code which transmits at least one public key associated with a second server to the client over the first secured communication session wherein the at least one public key is provided separate from any associated application code class files.

28. A computer program product according to claim 27 wherein the computer readable code which establishes a first secured communication session comprises computer readable code which establishes a first secured SSL communication session.

29. A computer program product according to claim 28 wherein the second server is the server and wherein the computer readable code which establishes a first secured SSL communication session comprises computer readable code which establishes a HTTPS communication session and wherein the computer readable code which establishes a first secured SSL communication session further comprises computer readable code which establishes a second secured SSL communication session between the client and the server using the at least one public key, which second secured SSL communication session utilizes a communications protocol other than HTTP.

30. A computer program product according to claim 28 wherein the second server is different from the first server.

31. A computer program product according to claim 30 wherein the first secured SSL communication session is an HTTPS session.

32. A computer program product according to claim 30 wherein the computer readable code which transmits further comprises computer readable code which transmits a public key ring including the at least one public key associated with the second server and at least one additional public key associated with a third server different from the first server and the second server.

33. A computer program product for establishing secured communication sessions, comprising:
    a computer readable storage medium having computer readable program code embodied in said medium, said computer readable program code comprising:
        computer readable code which establishes a first secured communication session between a client and a first server based on a certificate transmitted from the first server to the client, the first server certificate being supported by a public key ring of the client; and
        computer readable code which receives at least one public key associated with a second server different from the first server from the first server over the first secured communication session; and
        computer readable code which establishes a second secured SSL communication session between the client and the second server based on the at least one public key.

34. A computer program product according to claim 33 wherein the computer readable code which establishes a first secured communication session comprises computer readable code which establishes a first secured SSL communication session.

35. A computer program product according to claim 34 wherein the at least one public key is not included in the public key ring of the client.

36. A computer program product according to claim 35 wherein the at least one public key is provided separate from any associated application code class files.

37. A computer program product according to claim 35 wherein the computer readable code which establishes a first secured SSL communication session comprises computer readable code which establishes a HTTPS communication session and wherein the computer readable code which establishes a second secured SSL communication session comprises computer readable code which establishes a second secured SSL communication session utilizes a communications protocol other than HTTP.

38. A computer program product according to claim 35 wherein the computer readable code which transmits further comprises computer readable code which transmits a public key ring including the at least one public key associated with the second server and at least one additional public key associated with a third server different from the first server and the second server.

\* \* \* \* \*